Figure 1:
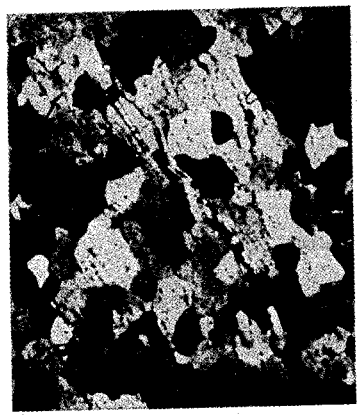

INVENTOR.
Marion L. Picklesimer
BY
ATTORNEY

July 14, 1959  M. L. PICKLESIMER  2,894,866
METHOD FOR ANNEALING AND ROLLING ZIRCONIUM-BASE ALLOYS
Filed Jan. 21, 1958  2 Sheets-Sheet 2

INVENTOR.
Marion L. Picklesimer
BY

ATTORNEY

United States Patent Office 2,894,866
Patented July 14, 1959

2,894,866
METHOD FOR ANNEALING AND ROLLING ZIRCONIUM-BASE ALLOYS

Marion L. Picklesimer, Knoxville, Tenn., assignor to the United States of America as represented by the United States Atomic Energy Commission Application January 21, 1958, Serial No. 710,369

5 Claims. (Cl. 148—11.5)

My invention relates to the fabrication of alpha-stabilized zirconium-base alloys and more particlarly to the fabrication of zirconium-base alloys containing minor proportions of tin, iron, chromium and nickel.

One of the problems encountered in the nuclear energy field is the provision of suitable structural metals for nuclear reactors. Various types of nuclear reactors employ aqueous systems as coolant, moderator or fuel. Among the properties required for a structural metal to contain aqueous systems in a nuclear reactor are a high degree of corrosion resistance, low neutron adsorption characteristics and sufficient mechanical strength to withstand high temperatures and pressures.

Zirconium-base alloys have been found suitable in regard to their corrosion resistance and neutron absorption properties. Zirconium exhibits a phase transformation, transforming from the close-packed hexagonal crystal structure existing at the lower temperatures and called alpha phase, to a body-centered cubic crystal structure existing at the higher temperatures and called beta phase. The alloys of zirconium in which the alpha phase is stabilized by the alloying additions to temperatures above that of its normal existence, are called alpha-stabilized alloys.

A particularly suitable type of alpha-stabilized alloy, referred to as Zircaloy-2, contains 1.2 to 1.7 weight percent tin, 0.07 to 0.20 weight percent iron, 0.05 to 0.15 weight percent chromium and 0.03 to 0.08 weight percent nickel. Engineering data for this alloy may be found in The Metallurgy of Zirconium, N.N.E.S., v. VII–4, p. 742, McGraw-Hill (1955). While suitable in regard to corrosion resistance and neutron absorption, this alloy as fabricated by previously available methods exhibits mechanical weakness which could cause premature failure in stressed applications. Mechanical weakness of the alloy is evidenced by a relatively high degree of anisotropy as measured by means of Charpy impact strength testing.

In the fabrication of Zircaloy-2 the alloy is worked from relatively thick ingots to finished products in the form of sheets, tubes, rods and the like. In the fabrication procedure commonly employed up to the present time size reduction and annealing were performed at a temperature of 845° C., this temperature being below the temperature then thought to be the alpha transition temperature. Upon being heated, Zircaloy-2 undergoes a phase transformation from the alpha phase to the beta phase. This transformation takes place gradually over a range of temperatures so that there exists the alpha phase at low temperatures, a mixture of alpha and beta phases at an intermediate temperature range and the beta phase at high temperatures. The amounts of each phase present in the intermediate alpha-plus-beta region are determined by the particular temperature and the exact composition of the alloy. Up to now a temperature of 900° C. had been believed to be the transition temperature from the alpha phase to the alpha-plus-beta region and 1000° C. for the alpha-plus-beta to beta transition temperature.

Examination of the microstructure of Zircaloy-2 fabricated by the procedure previously employed reveals a fine-grained crystal structure with numerous stringers present at the grain boundaries and even through the grains, with a high degree of orientation of the crystals, that is, a preferential alignment of the crystal axes of all the grains in a given direction. While a fine-grained structure is desirable, the stringers and the preferential orientation of the crystals modify the physical properties of the alloy in certain directions in the fabricated product, causing anisotropy in the mechanical properties of the material.

I have now found that the presence of stringers and preferential orientation in the fabricated articles previously produced resulted from performing size reduction and annealing operations at unfavorable temperatures. In this connection I have further found that the values previously assigned as phase transition temperatures for Zircaloy-2 are erroneous. The correct value for the transition temperature from the alpha phase to the alpha-plus-beta region is 810° C. instead of 900° C., and the alpha-plus-beta to beta transition occurs at 970° C. instead of 1000° C. The stringers had previously been assumed to be entirely voids, but examination of alloy specimens by means of photomicrographs reveals that some of the stringers are metallically continuous with the matrix of the alloy crystals. Although my invention is not to be understood as restricted by any particular theory, these stringers are postulated to be brittle intermetallic compounds formed as a result of the decomposition, on cooling, of the beta phase formed when the alloy is maintained within the alpha-plus-beta phase temperature range for an extended period of time. Some of the alloy constituents apparently partition to the beta phase present, resulting in a high degree of concentration of these constituents in the beta phase.

It is, therefore, an object of my invention to provide a method of fabricating alpha-stabilized zirconium-base alloys in which a high degree of isotropy in mechanical properties is obtained.

Another object is to provide a method of fabricating Zircaloy-2 in which preferential orientation of the metallic crystals is avoided.

Another object is to provide a method of fabricating Zircaloy-2 in which a fine-grained structure without the presence of intermetallic stringers is obtained.

Another object is to provide a method of removing intermetallic stringers from Zircaloy-2.

Another object is to provide a method of randomizing the crystal structure of Zircaloy-2 already having preferentially oriented crystals.

Other objects and advantages of my invention will be apparent from the following detailed description.

In accordance with my invention a Zircaloy-2 article may be fabricated by heating to an elevated temperature excluding the range of 810° C. to 970° C., working at a temperature excluding the range of 810° C. to 970° C., heat treating at a temperature above 970° C. for at least approximately thirty minutes, cooling rapidly, working at a temperature below approximately 500° C. to reduce the cross-sectional area by at least 20 percent, annealing at a temperature from approximately 700° C. to 810° C. for at least approximately fifteen minutes and finally cooling the article thus fabricated. In this procedure the formation of intermetallic stringers is substantially completely avoided by performing the various metallurgical operations on the alloy at temperatures excluding the alpha-plus-beta region. The steps of heat-treating the alloy at a temperature above 970° C. after the initial working step and rapidly cooling serve to remove any stringers which may be present in the alloy and to prepare the alloy for randomization of the preferentially oriented crystals. The cold size reduction of 20% and the subsequent annealing step result in a fine-grained, more-randomly oriented crystal structure. Zircaloy-2 fabricated by this procedure exhibits a relatively high degree of isotropy of mechanical properties as a result of the fine-grained, randomly oriented crystal structure, without the presence of intermetallic stringers.

Major size-reduction is performed on the initial work-piece by means of a preliminary working step. In this step the ingot or other thick form is reduced to an intermediate size. The form of the work-piece after this step must be such that at least a 20% size reduction remains to be performed in the subsequent cold-working step, since a 20% size reduction is essential to the effectiveness of the cold working. Aside from this limitation, the degree of size-reduction in the initial working step is not critical. The initial working step may be performed by heating the work-piece to a malleableizing temperature, excluding the range of 810° C. to 970° C., maintaining this temperature for at least approximately thirty minutes, and working by means of rolling or forging at this temperature. A temperature within the range of 700° C. to 800° C. or 1000° C. to 1050° C. is preferred for the initial working step. Temperatures above 970° C. are preferred for major size reduction of large ingots. However, at temperatures above approximately 900° C. the alloy is rapidly contaminated at the surface by oxidation and nitration. For small work-pieces this contamination is sufficiently critical that the major size reduction is preferably performed at temperatures below 810° C. or in an inert atmosphere.

Following the initial working step the intermediate shape is subjected to a heat treatment in the beta phase, that is, at a temperature above 970° C. In this step the article is held at a temperature of over 970° C. for at least approximately thirty minutes and cooled rapidly to an alpha phase temperature, that is, below 810° C. This treatment serves to remove any intermetallic stringers which may be present and to prepare the alloy for randomization of the crystal structure. Upon rapidly cooling from the beta phase, the alloy transforms to a fine, martensitic needle-type alpha crystal structure oriented according to the prior beta grain structure. The resulting oriented structure is broken up by a subsequent cold size-reduction of at least 20%, permitting, on annealing, the nucleation and growth of randomly oriented, small, equi-axed alpha grains. In order to prevent contamination of the alloy, it is preferred to conduct any heating above 970° C. under an inert atmosphere. Cooling from the beta phase must be accomplished rapidly to avoid holding the alloy in the alpha-plus-beta region. Water quenching is preferred, although other media, such as air or oil may also be employed within the scope of my invention, provided that a rapid cooling rate is obtained.

The microstructure of the alloy after cooling from the beta phase as described above is a fine-grained, martensitic type alpha crystal structure. In order to obtain a fine-grained, equi-axed alpha crystal structure it is necessary to effect a further size reduction of at least 20% by cold working, that is, working at a temperature below approximately 500° C. and then to anneal in the upper region of the alpha range, that is, slightly below 810° C. Merely heating to a temperature in the upper region of the alpha range restores the annealed alpha crystal structure, but results in an undesirable coarse-grained structure. Reducing the cross-sectional area of the intermediate work-piece by at least 20% to final size by any conventional means, such as rolling or forging, before annealing is necessary to provide a fine-grained structure. Size reductions of less than 20% reduce the grain-size slightly but not sufficiently for the desired mechanical properties. The final annealing step may be performed in the upper region of the alpha range, i.e., from approximately 700° C. to 810° C., but a temperature of 750° C. to 780° C. is preferred. This annealing step comprises maintaining this temperature for at least approximately fifteen minutes after the article has reached this temperature throughout. The finished article is then cooled by any conventional means, a water quench being preferred.

Where the work-piece has already been substantially reduced in size under conditions favoring the formation of stringers, my invention may be employed to remove a substantial portion of such stringers. In this case the major size reduction step is omitted. The heat treatment, cold size-reduction of at least 20% and annealing are performed as explained above.

During the course of the procedure described above, the alloy surface may become contaminated with oxides and impurities. Although not essential to my invention, the alloy surface may suitably be cleaned by any conventional means such as sand blasting and pickling while the alloy is at a low temperature between the various steps of the procedure.

My invention is further illustrated by the following specific examples.

Example I

A specimen of Zircaloy-2 as fabricated by the prior art procedure was examined by means of a microscope. This specimen had been hot rolled and annealed at 845° C. The specimen was chemically polished, anodized and photographed under polarized light at a magnification of 500 times. The resulting photomicrograph is reproduced as Figure 1. From an examination of Figure 1, it may be seen that the specimen has a fine-grained, equi-axed crystal structure and that a high degree of preferential orientation or alignment of the crystals is present. The presence of stringers in the specimen is evidenced by the lustrous-appearing narrow elongated structures extending in a direction approximately from the upper left-hand corner diagonally toward the lower right-hand corner of Figure 1.

Example II

Figure 2:
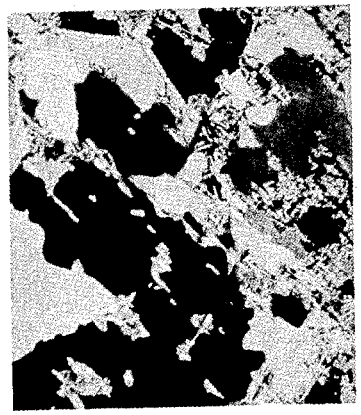

A specimen of Zircaloy-2 was heated to a temperature of 1000° C. for thirty minutes, water quenched, heated to 700° C. for two hours and water quenched again. The specimen was then chemically polished, anodized and photographed under polarised light at a magnification of 100 times. The resulting photomicrograph is reproduced as Figure 2. The heat treatment at 1000° C. transformed the specimen to the beta phase and the subsequent water quench caused the transformation of the beta phase to alpha phase to result in the martensitic-type structure. It may be seen from an examination of Figure 2 that the heat treatment at 700° C. partially restored an equi-axed alpha grain structure. This treatment eliminated the stringers present in the starting material and tended to randomize the grain structure. However, the grain-size obtained from this specimen is much larger than that of the starting material depicted at five times greater magnification in Figure 1, and much larger than is usually desired.

Example III

Figure 3:
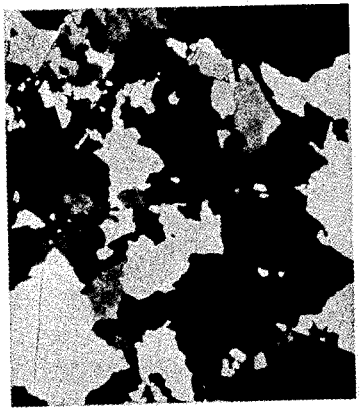

A specimen of Zircaloy-2 was heated to 1000° C. for thirty minutes, water quenched, cold rolled from a temperature of 500° C. to reduce the cross-sectional area of the specimen by 10%, heated to 800° C. for fifteen minutes and water quenched. The specimen was then chemically polished, anodized and photographed under polarized light at a magnification of 100 times. The resulting photomicrograph is reproduced as Figure 3. It may be seen from an examination of Figure 3 that the specimen exhibits a large-grained crystal structure similar to the result obtained in Example II.

Example IV

Figure 4:
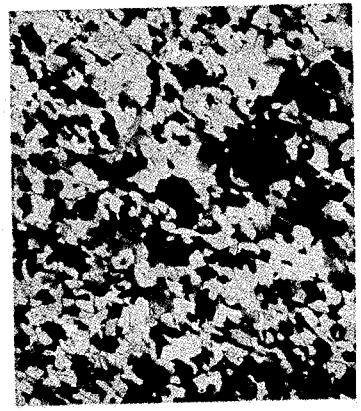

A specimen of Zircaloy-2 was heated to 1000° C. for thirty minutes, water quenched, cold rolled at a temperature of 500° C. to reduce the cross-sectional area of the specimen by 20%, heated to 800° C. for fifteen minutes and water quenched. The specimen was then chemically polished, anodized and photographed under polarized light at a magnification of 100 times. The resulting photomicrograph is reproduced as Figure 4. It may be seen from Figure 4 that a fine-grained, randomly oriented, grain structure was obtained without the presence of stringers.

*Example V*

Figure 5:
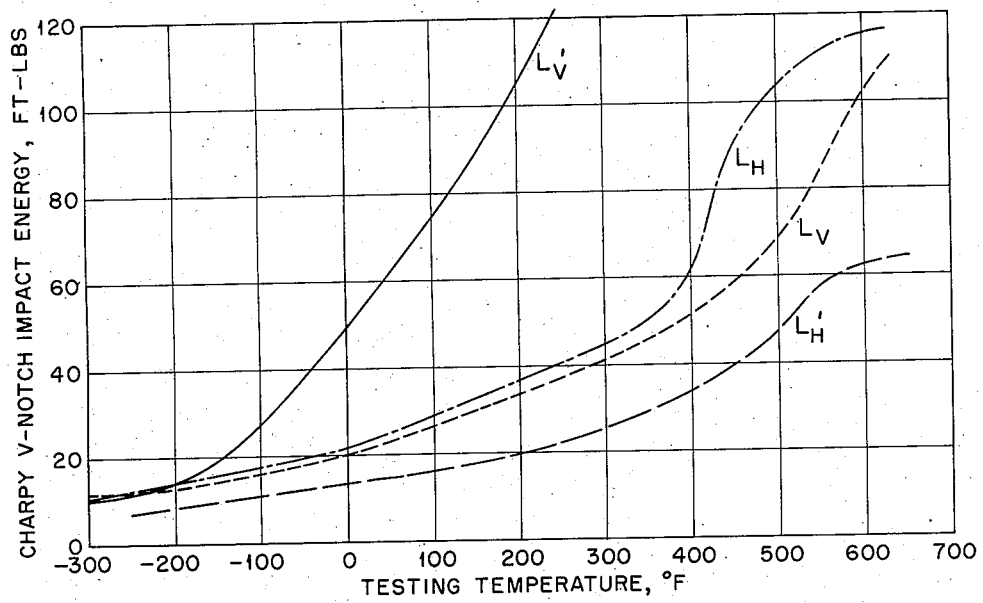
Figure 6:
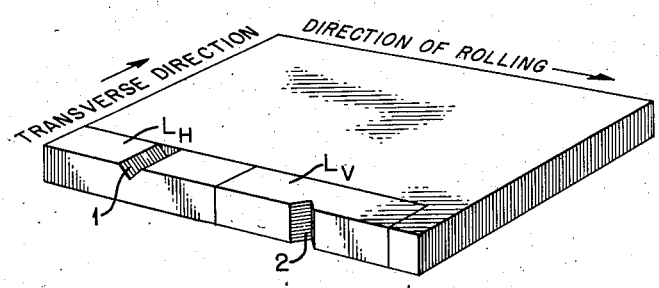

A standard ASTM Charpy V-Notch Impact Test, as described in The Metals Handbook, p. 113 (1948), was used to compare the isotropy in mechanical properties of Zircaloy-2 fabricated by the previously accepted procedure with Zircaloy-2 treated in accordance with my invention. Longitudinal specimens, that is, specimens taken in the direction in which the Zircaloy-2 was rolled, were tested for horizontal and vertical notch impact strength. The orientation of the specimens in the Zircaloy-2 plate may be seen by reference to Figure 6. A specimen with a horizontal notch 1, designated as $L_H$ in Figure 6, and a specimen with a vertical notch 2, designated as $L_V$ in Figure 6, were prepared from material treated by the procedure of my invention and from material treated by the previously accepted procedure. The fabrication history of the material treated by the procedure of my invention was as follows: The alloy was forged at 1000° C. from an ingot approximately 12 inches in diameter to a slab 6 inches thick. The slab was rolled to a 7/10 inch plate at temperatures from 1000° C. to 950° C. The plate was then air cooled, sand blasted and pickeled. The cold plate was then heated to 1000° C., held at 1000° C. for thirty minutes and water quenched. The quenched plate was heated to 500° C. and rolled to a thickness of ½ inch from 500° C. The plate was then annealed at 780° C. for thirty minutes, air cooled, sand blasted and pickled. The material prepared by the previously accepted procedure had been fabricated as follows: The alloy was reduced from an ingot 12 inches thick to a 6 inch slab by forging at 899° C., which is within the alpha-plus-beta range. The slab was then hot-worked to a 7/10 inch plate. The 7/10 inch plate was then reduced to ½ inch plate by rolling from 843° C. The finally reduced plate was annealed at 843° C. The impact strength of each of the specimens was tested at temperatures up to 650° F. The results of the tests may be seen by reference to Figure 5. The curves obtained for the alloy fabricated by the procedure of my invention are designated as $L_H$ and $L_V$, and the curves obtained for the alloy prepared by the previously accepted procedure are designated as $L_{H'}$ and $L_{V'}$. The $L_{H'}$ and $L_{V'}$ curves are far apart, indicating a high degree of anisotropy of mechanical properties. Thus, the previous method resulted in material exhibiting a high degree of notch sensitivity in the horizontal direction and a low degree in the vertical. The curves $L_H$ and $L_V$ are close together, indicating that the material fabricated by the procedure of the present invention has substantially the same mechanical properties in each of these directions.

Although my invention is primarily applicable to Zircaloy-2, it is not to be understood as so limited. Other zirconium-base alloys containing a minor proportion of alpha-stabilizing alloying elements, such as tin and aluminum, may also be fabricated by the procedures described herein, with the phase transition temperatures for the alloy involved providing the specific temperature limitations. The variation of the phase transition temperatures of other alpha-stabilized, zirconium-base alloys from those of Zircaloy-2 may be determined by routine experimentation.

It is also to be understood that many variations in apparatus and procedure employed may be used within the scope of my invention. In addition, the above examples are merely illustrative and are not to be construed as limiting the scope of my invention, which is limited only as indicated by the appended claims.

Having thus described my invention, I claim:

1. In the art of fabricating a work-piece consisting of a zirconium-base alloy containing a minor proportion of alpha-stabilizing alloy additions, the method which comprises performing major size reduction at a malleableizing temperature excluding the alpha-plus-beta range, heating the work-piece to a temperature in the beta range and maintaining the work-piece at said temperature for at least approximately thirty minutes, cooling said work-piece rapidly, reducing the cross-sectional area of said work-piece by at least twenty per cent while maintaining said work-piece at a temperature of under approximately 500° C., annealing the resulting article for at least fifteen minutes at a temperature in the upper extent of the alpha range, and cooling said article rapidly.

2. In the art of fabricating a Zircaloy-2 work-piece the method which comprises substantially reducing the cross-sectional area of said work-piece while maintaining the temperature of said work-piece at a malleableizing temperature excluding the range of 810° C. to 970° C., maintaining said reduced work-piece at a temperature of at least 970° C. for at least approximately thirty minutes, cooling said work-piece rapidly, further reducing the cross-sectional area of said work-piece by at least twenty percent while maintaining said work-piece at a temperature under approximately 500° C., annealing the resulting article at a temperature from 700° C. to 810° C. for at least approximately fifteen minutes and cooling said article rapidly.

3. In the art of fabricating a Zircaloy-2 work-piece, the method which comprises substantially reducing the cross-sectional area of said work-piece while maintaining said work-piece at a temperature over 970° C., maintaining said reduced work-piece at a temperature over 970° C. for at least approximately thirty minutes, cooling said work-piece rapidly, further reducing the cross-sectional area of said work-piece by at least twenty percent while maintaining said work-piece at a temperature under approximately 500° C., annealing the resulting article at a temperature from 750° C. to 780° C. for at least approximately fifteen minutes and cooling said article rapidly.

4. In the art of fabricating a Zircaloy-2 work-piece, the method which comprises substantially reducing the cross-sectional area of said work-piece while maintaining said work-piece at a temperature from 700° C. to 810° C., heating said reduced work-piece to a temperature above 970° C. and maintaining said work-piece at a temperature above 970° C. for at least approximately thirty minutes, cooling said work-piece rapidly, further reducing the cross-sectional area of said work-piece by at least twenty percent while maintaining said work-piece at a temperature under approximately 500° C., annealing the resulting article at a temperature from 700° C. to 810° C. for at least approximately fifteen minutes and cooling said article.

5. In the art of fabricating a Zircaloy-2 work-piece, the method which comprises heating said work-piece to a temperature of at least 970° C. and maintaining said work-piece at said temperature for at least approximately thirty minutes, cooling said work-piece rapidly, reducing the cross-sectional area of said work-piece by at least twenty percent while maintaining said work-piece at a temperature not exceeding 500° C., annealing the resulting article for at least approximately fifteen minutes at a temperature from 700° C. to 810° C. and cooling said article rapidly.

References Cited in the file of this patent

UNITED STATES PATENTS 2,736,651    Schwope et al. _____ Feb. 28, 1956

OTHER REFERENCES

Journal of Metals, vol. 8, October 1956, pp. 1306–1307.